March 25, 1930.    G. E. DICKSON    1,751,799
WEATHERPROOF NAIL
Filed Oct. 2, 1925
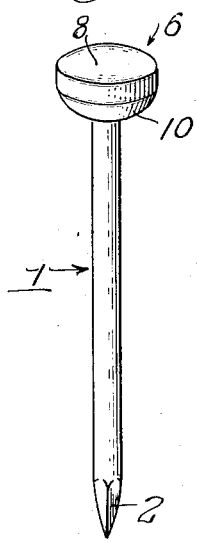
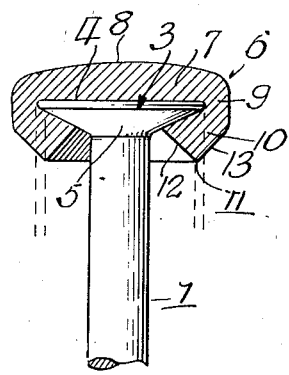
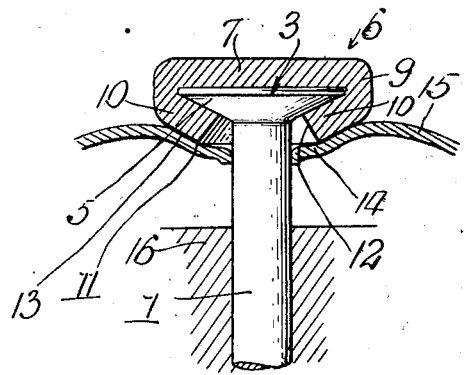
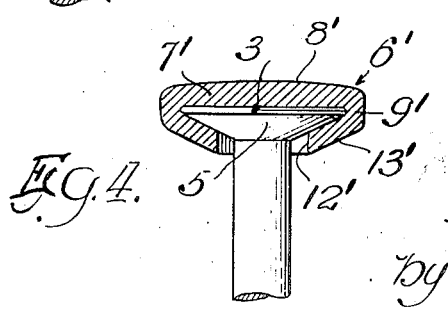
Inventor
George E. Dickson
by Arthur W. Nelson Atty.

Patented Mar. 25, 1930

1,751,799

UNITED STATES PATENT OFFICE

GEORGE E. DICKSON, OF CHICAGO, ILLINOIS

WEATHERPROOF NAIL

Application filed October 2, 1925. Serial No. 60,009.

This invention relates to improvements in weatherproof nails and consists of the matters hereinafter described and more particularly pointed out in the appended claims.

My improved weatherproof nail includes a soft metal cap which encloses the head of the nail but heretofore the cap included a skirt or portion arranged below the nail head and so formed that when the nail was driven into place to provide a seal between the cap and that member into and through which the nail was driven, the skirt spread radially outward. When the skirt was thus spread or expanded radially outward the tendency was to separate the cap from the head of the nail and in some instances to remove it entirely.

The primary object of the present invention is to provide a weatherproof nail having a skirt portion in which the outward spreading is eliminated or reduced to such an extent that the effectiveness of the nail is not impaired and which preferably is of such construction that it crowds itself radially inward in the driving of the nail so that said skirt portion is somewhat compressed toward the shank of the nail and thus eliminates spreading and insuring not only a better adhesion or bond between the nail head and cap but also a better seating of the cap upon that member with which it engages in the driving of the nail.

A further object of the invention is to provide a weatherproof nail having a cap which includes a skirt edge of a diameter approximating but preferably less than that of the nail head so that in the driving of the nail, it is the inherent tendency of the cap skirt to turn or be deformed radially inward instead of outward as heretofore.

Again it is an object of my invention to provide a weatherproof nail having a cap which includes a lower annular portion adapted to contact with the material into which the nail is driven and which is of a diameter not substantially greater than the diameter of the nail head.

These objects of the invention, as well as others, together with the many advantages thereof will fully appear as I proceed with my specification.

In the drawings:

Fig. 1 is a perspective view on an enlarged scale of a weatherproof nail embodying my invention.

Fig. 2 is a view in elevation on a further enlarged scale of the head end of the nail, with the cap in position thereon in vertical section to show its construction before driving.

Fig. 3 is a view similar to Fig. 2 after the nail has been driven and more clearly shows the skirt portion deformed or turned radially inward.

Fig. 4 is a detail view similar to Fig. 2 but illustrating a modified form of my invention.

Referring now in detail to that embodiment of the invention illustrated in the accompanying drawing, 1 indicates the cylindrical shank of an ordinary wire nail having a driving point 2 at one end and a head 3 at the other end. The head 3 of the nail is of a diameter greater than the shank and is flat as at 4 on its top surface and tapers downwardly on its bottom surface as at 5 to meet the shank 1, as best shown in Fig. 2.

6 indicates the cap as a whole which is made of a relatively soft metal as lead and encloses the major portion of the head 3. Said cap includes a top wall or portion 7 having a rounded top surface 8, a peripheral portion 9 of suitable thickness, and a bottom skirt portion 10 which depends a suitable distance below the plane of the junction between the nail shank 1 and head 3. As shown herein, said skirt portion has an annular edge 11 of a diameter approximating but preferably less than that of the head and coaxial with the shank portion of the nail as is apparent from the parallel dotted lines in Fig. 2. The inner and outer sides 12 and 13 of the skirt taper upwardly in opposite direction from said edge 11, the inner side 12 terminating at the tapered portion 5 of the head adjacent the shank and the outer side 13 meeting the periphery of the cap portion 9 as shown.

My weatherproof nail is especially adapted for use in securing corrugated metal sheets in place upon studding and roofing rafters and the like and under such conditions in the driving of the nail the point 2 depresses a part 14 of the metal plate 15 before it pierces the metal plate and enters the studding or rafter 16. As the nail head approaches the metal plate 15 the skirt 10 enters the depressed part 14 and the edge 11 of the skirt is deformed and somewhat compressed radially inward to not only conform fully to the contour of the depressed part 14 of the metal so as to prevent the entrance of moisture between the cap and said depressed part but also to increase the bond between said skirt and the underside 5 of the nail head. In hammering upon the cap, the originally rounded top of the cap is somewhat flattened as shown in Fig. 3 and the outer annular surface 13 of the skirt is brought into substantial parallelism with the tapered underside of the head. Again the relatively soft metal is rendered more dense and as spreading of the skirt is eliminated separation of the cap and head is prevented. Thus danger of entrance of moisture beneath said skirt is eliminated.

In the modification shown in Fig. 4 the nail proper bears the same reference characters as in Figs. 1 to 3 inclusive since it is of like construction. The cap 6', however, differs in some respects. Its top portion 7' has a top surface 8' which while curved is more nearly flat than the form first referred to so that less metal is required. The peripheral portion 9' is preferably of slightly less thickness than that of the top of the cap. The under or skirt portion 10' is here shown as of substantially uniform thickness and has a lower surface 13' which is substantially parallel to the bottom surface 5 of the nail head. The skirt terminates in a surface 12' which is spaced outwardly of the nail shank. Because of the shape of the surface 13' of the skirt it conforms substantially to the depression formed in the surface through which the nail is driven as before described, so that the action, upon contact therewith, is mainly to compress the skirt and to conform the bottom of the skirt to irregularities in the contiguous surface and thereby form a good weathertight joint. This construction is advantageous for certain purposes, and as the cap contains less metal it is cheaper to produce.

With my improved nail the head even after driving the nail, is enclosed in a solid compact mass because there is no peeling of the cap at the periphery of the nail head and no splitting or spreading of the skirt can take place.

While in describing my invention I have described the same as a "nail" but this is for purpose of illustration only of one form of a fastening device, because as will be apparent, the invention may be embodied in other fastening devices, as for instance in bolts, where the peculiar characteristics of the invention make it advantageous to do so.

I claim as my invention:

1. A weatherproof nail embodying therein a shank and a head, and a cap member of relatively soft metal enclosing said head, said cap member having a skirt portion which depends below said head and includes inner and outer bevelled annular surfaces which meet to define an edge coaxial with said shank and of a diameter approximating but not greater than that of said head, said skirt portion being the thickest in the plane of said edge.

2. A weatherproof nail embodying therein a shank and a head, and a cap member of relatively soft metal enclosing said head, said cap member having a top wall, a peripheral wall and a skirt including inner and outer bevelled surfaces which meet to define an annular edge coaxial with said shank and of a diameter less than that of said head, said skirt portion being the thickest in the plane of said edge so that upon meeting that member into which the nail is driven it is deformed and compressed inwardly to conform to that portion of said member with which it engages.

3. A weatherproof nail embodying therein a shank and a head and a cap member of relatively soft metal enclosing the top, sides and a portion only of the bottom of said head and including a skirt portion having an annular edge spaced radially from the shank and being of a diameter less than that of the head, said skirt being the thickest in the plane of said edge and adapted for radially inward compression and deformation upon engaging the member into which the nail is driven.

In testimony whereof, I have hereunto set my hand, this 23d day of September, 1925.

GEORGE E. DICKSON.